United States Patent Office 2,759,940
Patented Aug. 21, 1956

2,759,940

ANTHRAPYRIDINES AND THE PREPARATION THEREOF

Paul Bücheler, Basel, and Albin Peter, Binningen, Switzerland, assignors, by mesne assignments, to Sandoz A. G., Basel, Switzerland, a Swiss firm No Drawing. Application July 10, 1952, Serial No. 298,182

Claims priority, application Switzerland July 12, 1951

12 Claims. (Cl. 260—272)

The present invention relates to anthrapyridines and to the preparation thereof.

The anthrapyridines according to this invention are prepared by heating a primary 1-aminoanthraquinone which corresponds to the formula

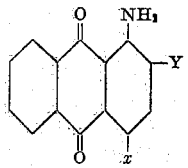

wherein X stands for Cl, Br, $NO_2$, $OCH_3$ or arylamino, and Y stands for H, Cl, Br, alkyl or $SO_3H$ and also, when X is arylamino, for alkoxy or aryloxy—under acid conditions with an acetoacetic acid alkyl ester and, if desired, treating the resultant product with a sulfonating agent.

More specifically stated, and as will also appear from the exemplary embodiments of the invention hereinafter described, the process for the preparation of the said anthrapyridines comprises the steps of condensing a primary amine of the anthraquinone series with a lower alkyl ester of acetoacetic acid ester under acid conditions in an organic solvent at temperatures between 100° and 180° C., while distilling off the by-products formed during the reaction, said primary amine corresponding to the formula (a)

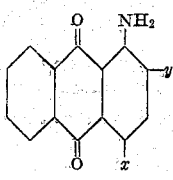

or to the formula (b)

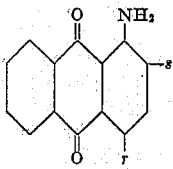

wherein $x$ stands for Cl, Br, $NO_2$ or $OCH_3$, and $y$ stands for H, Cl, Br, lower alkyl or $SO_3H$; $r$ stands for arylamino of the benzene or naphthalene series, and $s$ stands for H, Cl, Br, lower alkyl, $SO_3H$, lower alkoxy or mononuclear aryloxy.

Suitable primary 1-aminoanthraquinone starting materials comprise, for example, 1-amino-2-methyl-4-nitroanthraquinone, 1-amino-2-methyl-4-methoxyanthraquinone, 1-amino-4-halogenoanthraquinones such as 1-amino-2,4-dichloroanthraquinone, 1-amino-2,4-dibromoanthraquinone, 1-amino-2-methyl-4-chloroanthraquinone, 1-amino-2-methyl-4-bromoanthraquinone, 1-amino-4-chloroanthraquinone, 1-amino-4-bromoanthraquinone, and 1-amino-4-bromoanthraquinone-2-sulfonic acid; also the products of the condensation of these 1-aminoanthraquinones with aromatic amines which carry no further unsubstituted or substituted amino groups, such for example as aminobenzene, the aminomethylbenzenes, aminodimethylbenzenes, aminotrimethylbenzenes, the amino-chlorobenzenes, aminomethoxybenzenes, amino-ethoxybenzenes, amino-phenoxybenzenes, 4-aminodiphenyl, aminopyrene, the naphthylamines, ar.-tetrahydronaphthylamines, etc., and the sulfonic acids obtainable from these condensation products by sulfonation; also the 1-amino-2-methoxy-4-arylaminoanthraquinones and the corresponding -2-ethoxy-, -2-propyloxy-, -2-butyloxy-, etc. derivatives, and the 1-amino-2-phenoxy-4-arylaminoanthraquinones and the corresponding -2-cresoxy-, -2-butylphenoxy-, -2-amylphenoxy-, -2-octylphenoxy-, etc. derivatives and their sulfonic acids.

In order to condense the selected starting material with an acetoacetic acid alkyl ester to form the corresponding anthrapyridines, the presence of acid compounds is necessary. In the event that the starting material contains a sulfonic acid group, it is sufficient in many cases to employ it in the form of the free acid. In most cases, however, it is necessary to add acidic substances such, for example, as sulfuric acid, phosphoric acid, alkane sulfonic acids, benzene sulfonic acid, toluene sulfonic acid, etc., or to pass an acid gas, such as hydrogen chloride or hydrogen bromide, through the reaction vessel.

Suitable acetoacetic acid alkyl esters comprise, for example, esters of acetoacetic acid with low molecular alcohols, such as methyl alcohol, ethyl alcohol, etc. The acetoacetic acid esters may themselves also serve as diluents, when used in excess, or, in this role, they may be replaced by inert solvents such as nitrobenzene, o-dichlorobenzene, chlorobenzene, hydroxybenzene, methoxybenzene, malonic acid diethyl ester, etc.

In order to effect the condensation, the reactants are heated to a temperature of about 100 to 180° C. In general, the reaction can be run to completion in less than 24 hours at 120° to 150° C. The reaction proceeds with evolution of readily-volatile substances, among which the presence of acetone and alcohol is easily demonstrable. It is advantageous to distil off these readily-volatile substances or to withdraw them by means of a current of gas.

The fact that reaction has taken place is, in all cases, indicated by a hyposochromic shift in color of the reaction mixture. The reaction is complete when no further color change is apparent and when no more low-boiling substances pass over.

The reaction products are conveniently isolated in conventional manner, as for example by dilution of the reaction mixture with benzene or alcohol—in some cases with the addition of an acid-binding agent such as sodium carbonate—followed by filtration, washing and drying.

The new products are anthrapyridines, as is evident from the fact that they are derived from 1-aminoanthraquinones and acetoacetic acid alkyl esters, from their markedly heightened color relative to the starting materials, and from their elementary analysis. In view of the foregoing, it is clear that the products are characterized by the fundamental structure

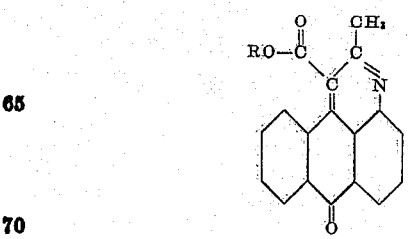

wherein R represents the alcohol residue contained in the acetoacetic acid alkyl ester.

The new anthrapyridines are starting materials for the preparation of dyestuffs and, insofar as they contain sulfonic acid groups, they are acid dyestuffs. Insofar as they contain unsulfonated arylamino groups, they can be sulfonated by treatment with sulfuric acid monohydrate, fuming sulfuric acid or chlorosulfonic acid, and thus converted into acid dyestuffs. The arylaminoanthrapyridines which carry a halogen atom in 2-position can be converted into sulfonic acids by treatment with aqueous sulfite solution at elevated temperatures, if necessary in the presence of phenol. The acid dyestuffs dye wool, silk and nylon in yellow to red shades.

The following examples set forth representative exemplary embodiments of the invention, and these examples are intended to be solely illustrative and not at all limitative. In these examples, the parts and percentages are by weight and the temperatures are expressed in degrees centigrade.

Example 1

15 parts of 1-amino-4-bromo-anthraquinone, 100 parts of acetoacetic acid ethyl ester, and 1 part of technical alkane sulfonic acid mixture (1 to 3 C atoms) are heated to 135° while stirring. Readily-volatile reaction products are removed from the reaction vessel by means of a gentle stream of air, and the temperature is maintained at 135° until a test specimen, withdrawn from the reaction mass, dissolves in concentrated sulfuric acid with citron-yellow coloration and the latter undergoes no further change upon addition of paraformaldehyde. Thereupon 100 parts of ethyl alcohol are added at 70°, and then the reaction mixture is allowed to cool to 20°. The resultant precipitate is suction-filtered off, washed with ethyl alcohol until the wash-liquid is colorless, and then washed with water and dried. The obtained product is a light-brown powder which dissolves in sulfuric acid with yellow coloration and melts at 159–161°. It corresponds to the formula

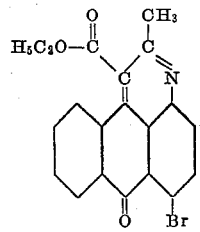

Example 2

18.5 parts of 1-amino-4-(2')-naphthylamino-anthraquinine, 40 parts of acetoacetic acid ethyl ester, 40 parts of chlorobenzene, and 4 parts of 1-methylbenzene-4-sulfonic acid are heated to 135° with good stirring. Readily-volatile reaction products are removed from the reaction vessel by means of a gentle stream of air, and the temperature is maintained at 135° until a test specimen, withdrawn from the reaction mixture, turns orange in ethyl alcohol and no further color change ensues. The reaction mixture is then allowed to cool, 150 parts of ethyl alcohol are added, and the resultant precipitate suction-filtered off. The precipitate is washed with ethyl alcohol until the wash-alcohol is only weakly colored, and then washed with water and dried. The thus-obtained base is a brown crystalline powder and dissolves in chlorobenzene with orange coloration.

5 parts of the base are added, while stirring, to 35 parts of sulfuric acid monohydrate and the mixture heated to 35° until a test specimen, neutralized with sodium hydroxide, is completely soluble in water. The mixture is thereupon poured into 500 parts of water. The resultant precipitate is suction-filtered off, washed with water until the wash-water is only weakly acid, admixed with 2 parts of sodium carbonate while still moist, whereby a paste is formed, and dried. The obtained dyestuff dyes wool orange.

Example 3

16.5 parts of 1-amino-4-(4'-methyl)-phenylaminoanthraquinone, 40 parts of acetoacetic acid ethyl ester, 40 parts of chlorobenzene and 3 parts of 1-methylbenzene-4-sulfonic acid are heated to 125° while stirring. The easily-volatile reaction products are removed by means of a gentle stream of air. The reaction mixture is kept at 125° until a test specimen withdrawn therefrom is colored orange in ethyl alcohol and no further color change takes place. Thereupon the reaction mixture is allowed to cool, 150 parts of ethyl alcohol are added and the mixture cooled down to 3° C. The resultant precipitate is suction-filtered off and washed with ethyl alcohol until the wash-liquid is only weakly colored, whereupon it is washed with water and dried. The thus-obtained base dissolves in benzene with orange coloration.

Example 4

150 parts of 1-amino-2,4-dibromo-anthraquinone, 300 parts of acetoacetic acid ethyl ester, 500 parts of chlorobenzene and 40 parts of 1-methylbenzene-4-sulfonic acid are heated to 100° while stirring. By passing a gentle stream of air over the reaction mixture, easily-volatile reaction products are removed. The temperature is gradually raised to 130° in the course of 4 hours and maintained at 130° until the color of a test specimen in pure sulfuric acid no longer changes toward the blue upon the addition of paraformaldehyde. Thereupon the reaction mixture is allowed to cool to 70° and 400 parts of ethyl alcohol are added. Whereupon the formed base crystallizes out as fine prisms. After cooling the mixture to 25°, the precipitate is suction-filtered off, washed with ethyl alcohol until the wash-liquid is colorless and then with water. The dried product—a weakly yellow-colored crystalline powder—melts at 207–210° and corresponds to the formula

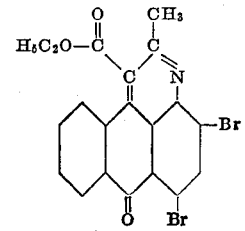

Example 5

15 parts of 1-amino-2,4-dichloro-anthraquinone, 100 parts of acetoacetic acid ethyl ester and 1 part of technical alkane sulfonic acid mixture are heated to 135° while stirring. Readily-volatile reaction products are removed from the reaction vessel by means of a gentle stream of air, and the temperature of the reaction mixture is kept at 140° until a test specimen therefrom is colored citron yellow in pure sulfuric acid of 96% strength and this color is only slightly displaced toward the brownish-yellow upon the addition of paraformaldehyde. Thereupon the reaction mixture is allowed to cool and the separated prismatic crystalline precipitate is suction-filtered off. It is then washed with ethyl alcohol until the wash-liquid runs colorless, and then with water, and dried. The thus-obtained product is a weakly gray-colored crystalline powder which dissolves in sulfuric acid with a citron yellow coloration. It melts at 227–229°.

Example 6

20 parts of 1-amino-2-bromo-4-(4'-methyl)-phenylamino-anthraquinone, 50 parts of acetoacetic acid ethyl ester, 100 parts of chlorobenzene and 8 parts of 1-methylbenzene-4-sulfonic acid are heated to 115° while stirring. Easily-volatile reaction products are removed with the aid of a weak current of air. The temperature of the reaction mixture is maintained at 115° until a withdrawn test specimen is colored orange in benzene and no further color change takes place. The reaction mixture is then allowed to cool to 80°, 150 parts of ethyl alcohol are added dropwise, and the mixture permitted to cool to room temperature (about 20°). The resultant precipitate is suction-filtered off and washed with ethyl alcohol until the wash-liquid is only weakly colored, whereupon washing is continued with water. The thus-obtained base is then dried, whereupon it assumes the form of an orange crystalline powder which melts at 213–214°. It dissolves with orange-yellow coloration in benzene.

10 parts of the said base are introduced, with stirring, into 90 parts of sulfuric acid monohydrate and 9 parts of fuming sulfuric acid of 28% strength, care being taken that the temperature does not exceed 40°. The mixture is maintained at 40° until a test specimen, neutralized with sodium hydroxide, is completely soluble in water. Thereupon the reaction solution is poured into 500 parts of an aqueous sodium chloride solution of 10% strength, and the separated precipitate suction-filtered off and washed neutral with aqueous sodium chloride solution (10%). The precipitate is then taken up in 300 parts of water at 95°, dissolution being effected by the addition of 3 parts of sodium carbonate, while stirring. Then the dyestuff is precipitated from the said solution, maintained at 95°, by the gradual addition of 12 parts of sodium chloride and 30 parts of sodium carbonate. The precipitate is suction-filtered off while hot, washed to neutrality with hot aqueous sodium chloride solution of 5% strength and dried.

The thus-obtained dyestuff dyes wool yellowish orange from an acid bath.

*Example 7*

40 parts of 1-amino-2-bromo-4-(4'-methyl)-phenyl-amino-anthraquinone and 150 parts of acetoacetic acid ethyl ester are heated to 140° while stirring and while passing a stream of dry hydrogen chloride over the surface of the reaction mass. The temperature of the latter is kept at 140° until a test specimen is colored orange-yellow in benzene and undergoes no further change in color. Thereupon, after cooling to 70°, 250 parts of ethyl alcohol are added. The precipitate, which assumes the form of needles, is suction-filtered off at room temperature (about 20°), washed with ethyl alcohol until the wash-liquid is only weakly colored, and then washed with water and dried. The thus-obtained base dissolves readily in benzene with orange-yellow coloration.

15 parts of the thus-obtained base, 15 parts of neutral aqueous potassium sulfite solution of 50% strength and 30 parts of phenol are heated to 130° for 16 hours in an autoclave. The phenol is steam-distilled from the reaction mass and the thus-obtained sulfonic acid is precipitated by the addition of hydrochloric acid. The precipitate is suction-filtered off and washed with hot water which has been acidified with a small quantity of hydrochloric acid. The precipitate is then introduced into 1500 parts by volume of water at 96°, 2 parts of sodium carbonate are added, and the solution filtered hot. To the filtrate, at 98°, 45 parts of sodium chloride are added and the dyestuff which crystallizes out is suction-filtered at 95°. The precipitate is then washed with hot aqueous sodium chloride solution of 3% strength, after which it is dried. The thus-obtained dyestuff dyes wool in orange-red shades from a weak acid bath.

*Example 8*

316 parts of 1-amino-2-methyl-4-bromo-anthraquinone are introduced, in the course of 2 hours and while stirring, into a mixture—heated to 130°—of 1000 parts of acetoacetic acid ethyl ester and 20 parts of technical alkane sulfonic acid, the easily-volatile reaction products being removed by means of a gentle current of air. Stirring is continued for 3 more hours at 135°, whereupon the reaction mass is allowed to cool down to 90°, at which temperature it is maintained for 1 hour. The reaction product crystallizes out in the form of prisms and is removed by suction filtration at 90°. The precipitate is washed with 200 parts of acetoacetic acid ethyl ester warmed to 80°, and thereafter with ethyl alcohol until the wash-liquid is only slightly colored, after which it is washed with water. The product is then dried and consists of orange-brown colored prisms which melt at 208–210°. The composition of such product may be represented by the formula

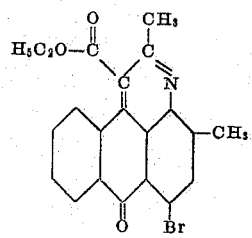

*Example 9*

14 parts of 1-amino-2-methyl-4-chloro-anthraquinone, 100 parts of acetoacetic acid ethyl ester and 1 part of technical alkane sulfonic acid mixture are heated to 130° while stirring. Easily-volatile reaction products are removed from the reaction vessel with the aid of a gentle current of air, and the temperature of the reaction mixture is maintained at 130° until a test specimen is colored citron yellow in pure sulfuric acid of 96% strength and this color undergoes no further change upon the addition of paraformaldehyde. The reaction mixture is then allowed to cool down to 20°, and the precipitate which crystallizes out in the form of platelets is suction-filtered off. The precipitate is washed with ethyl alcohol until the wash-liquid runs colorless, and then with water, after which it is dried. The thus-obtained product consists of brownish-yellow crystalline platelets which melt at 221–223° and dissolve with citron yellow coloration in sulfuric acid. The composition of such product may be represented by the formula

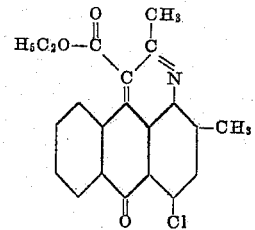

*Example 10*

21 parts of 1-amino-2-methyl-4-phenylamino-anthraquinone, 100 parts of acetoacetic acid ethyl ester and 4 parts of 1-methylbenzene-4-sulfonic acid are heated to 140° while stirring. Easily-volatile reaction products are removed from the reaction vessel with the aid of a gentle stream of air. The reaction mixture is maintained at 140° until a test specimen is colored orange-yellow in benzene and undergoes no further change in color. Thereupon, at 75°, 200 parts of ethyl acohol are added and the resultant precipitate is suction-filtered off. The precipitate is washed with ethyl alcohol until the wash-liquid runs only weakly colored, then with water, and then dried. 10 parts of the thus-prepared base are introduced with stirring into 70 parts of sulfuric acid monohydrate, and the mixture heated to and maintained at 40° until a test specimen, neutralized with sodium hydroxide, is completely soluble in water. The mixture is then poured, while stirring, into 1000 parts of water, to which 200 parts of sodium chloride and 200 parts of aqueous sodium hydroxide solution of 30% strength are added, the resultant precipitate being suction-filtered off. The precipitate is washed with aqueous sodium chloride solution of 5% strength, and dried. The thus-obtained dyestuff dyes wool orange-yellow.

Example 11

40 parts of 1-amino-2-methyl-4-(4'-methyl)-phenyl-amino-anthraquinone, 100 parts of acetoacetic acid ethyl ester, 50 parts of chlorobenzene and 10 parts of 1-methyl-benzene-4-sulfonic acid are heated to 105° while stirring. Passage of a gentle current of air removes easily-volatile reaction products. The reaction is continued at 105° until a test specimen withdrawn from the reaction mixture is a clear orange yellow in benzene and the color undergoes no further change. Thereupon 150 parts of ethyl alcohol are added at 80°, whereupon the formed base crystallizes out. It is suction-filtered off after cooling the reaction mass to 20°, and the precipitate then washed with ethyl alcohol until the wash-liquid runs only weakly yellow-colored, after which it is washed with water and dried. The base consists of orange needles which melt at 218–220° and dissolve with orange coloration in chlorobenzene.

10 parts of the thus-produced base are introduced, with stirring, into 90 parts of sulfuric acid monohydrate and 25 parts of fuming sulfuric acid of 28% strength. The mixture is kept at 40° until a test specimen, neutralized with sodium hydroxide, is completely soluble in water. The reaction mixture is then poured into 700 parts of water and then suction-filtered. The precipitate is stirred into 500 parts of water which have been warmed to 90°, and then 2 parts of sodium carbonate are added. The temperature is raised to 95°, 5 parts of sodium chloride are added, and the resultant crystalline precipitate is suction-filtered off hot, washed with hot aqueous sodium chloride solution of 1% strength until neutral, and then dried. The thus-obtained dyestuff dissolves with yellow-orange coloration in water and dyes wool a brilliant yellow-orange from an acid bath.

Example 12

22 parts of 1-amino-2-methyl-4-(3'-methyl)-phenyl-amino-anthraquinone, 100 parts of acetoacetic acid ethyl ester and 4 parts of 1-methylbenzene-4-sulfonic acid are heated to 140° while stirring. Easily-volatile reaction products are removed from the reaction vessel with the aid of a gentle stream of air. The temperature of 140° is maintained until a test specimen turns orange in benzene and there is no further change in this color. The reaction mixture is then allowed to cool down to 70°, at which temperature 100 parts of ethyl alcohol are added and then, after further cooling to 20°, the precipitate which separates in the form of crystalline platelets is suction-filtered off. The precipitate is washed with ethyl alcohol until the wash-liquid runs only slightly colored, after which it is washed with water and then dried. The thus-obtained base dissolves with orange coloration in benzene.

10 parts of the aforesaid base are stirred into 70 parts of sulfuric acid monohydrate and the mixture heated to 40° until a test specimen, neutralized with sodium hydroxide, is completely water-soluble. Then the mixture is poured, with stirring, into 1000 parts of water and 250 parts of sodium chloride, and the thus-produced precipitate suction-filtered off. This precipitate is then washed with aqueous sodium chloride solution of 25% strength, the moist precipitate pastified with the necessary quantity of sodium carbonate to convert the formed dyestuff into the sodium salt, and the paste then dried. The thus-obtained dyestuff dyes wool orange.

A similar dyestuff is obtained when while otherwise proceeding as described in the preceding two paragraphs, the 1-amino-2-methyl-4-(3'-methyl)-phenylamino-anthraquinone is replaced by an equivalent quantity of 1-amino-2-methyl-4-(2'-methyl)-phenylamino-anthraquinone.

Example 13

18 parts of 1-amino-2-methyl-4-(3',4'-dimethyl)-phenylamino-anthraquinone, 100 parts of acetoacetic acid ethyl ester and 4 parts of 1-methylbenzene-4-sulfonic acid are heated to 140° while stirring. Easily-volatile reaction products are removed from the reaction vessel with the aid of a gentle stream of air, the temperature of 140° being maintained until a test specimen turns orange in benzene and there is no further change in this color. The thus-produced base is then crystallized out in the form of prisms. 100 parts of ethyl alcohol are added to the reaction mixture at 80° and then, after cooling to 20°, the base is suction-filtered off. The precipitate is washed with ethyl alcohol until the wash-liquid runs only slightly colored, after which it is washed with water and dried. The dried base dissolves with orange coloration in benzene.

10 parts of the thus-prepared base are stirred into 70 parts of sulfuric acid monohydrate and the mixture heated to 40° until a test specimen, neutralized with sodium hydroxide, is completely soluble in water. Thereupon the mixture is poured into 1000 parts of water and the resultant precipitate suction-filtered off. It is taken up in 500 parts of water and 25 parts of sodium chloride. 5 parts of sodium carbonate are added, and the mixture stirred for 5 hours at room temperature (about 20°). The precipitate is then suction-filtered off, washed with aqueous sodium chloride solution of 5% strength, and dried. The thus-obtained dyestuff dyes wool orange.

Similar dyestuffs are obtained when, while otherwise proceeding as described in the preceding two paragraphs, the 1-amino-2-methyl-4-(3',4'-dimethyl)-phenylamino-anthraquinone is replaced by an equivalent amount of 1-amino-2-methyl-4-(2',3'-dimethyl)-phenylamino-anthraquinone, 1-amino-2-methyl-4-(2',4'-dimethyl)-phenylamino-anthraquinone or 1-amino-2-methyl-4-(2',5'-dimethyl-phenylamino-anthraquinone.

Example 14

18 parts of 1-amino-2-methyl-4-(2',6'-dimethyl)-phenylamino-anthraquinone, 100 parts of acetoacetic acid ethyl ester and 4 parts of 1-methylbenzene-4-sulfonic acid are heated to 140° while stirring. Easily-volatile reaction products are removed from the reaction vessel by means of a gentle stream of air. The temperature of 140° is maintained until a test specimen withdrawn from the reaction mixture turns yellow in benzene and there is no further change in this color. The reaction mixture is then allowed to cool down to 40°, diluted with 250 parts of methyl alcohol, cooled further to 0°, and the separated precipitate suction-filtered off. The precipitate is then washed with methyl alcohol until the wash-liquid runs only slightly colored, after which it is washed with water and dried. The thus-obtained base dissolves with yellow coloration in benzene.

10 parts of the said base are stirred into 70 parts of sulfuric acid monohydrate and the mixture maintained at a temperature of 40° until a test specimen, after having been neutralized with sodium hydroxide, is completely soluble in water. The mixture is then stirred into 1000 parts of water, the precipitate suction-filtered off and washed with water until the wash-water runs only weakly acidic. The moist precipitate is pasted with 4 parts of sodium carbonate, and then dried. The thus-obtained dyestuff dyes wool yellow.

A similar dyestuff is obtained when, in the present example and while otherwise proceeding as therein described, the 1-amino-2-methyl-4-(2',6'-dimethyl)-phenylamino-anthraquinone is replaced by an equivalent amount of 1-amino-2-methyl-4-(2',4',6'-trimethyl)-phenylamino-anthraquinone.

Example 15

18 parts of 1-amino-2-methyl-4-(3'-chloro)-phenylamino-anthraquinone, 40 parts of acetoacetic acid ethyl ester, 40 parts of chlorobenzene and 4 parts of 1-methyl-benzene-4-sulfonic acid are heated to 125° while stirring. Easily volatile reaction products are removed from the reaction vessel by means of a gentle stream of air, the temperature of 125° being maintained until a test specimen turns orange-yellow in benzene and there is no further change in this color. The reaction mixture is then allowed to cool and, at 70°, 150 parts of ethyl alcohol are added, the resultant precipitate being then suction-filtered off. The precipitate is washed with ethyl alcohol until the wash-liquid runs only weakly colored, after which it is washed with water and then dried. The thus-obtained base dissolves with yellow coloration in benzene.

7 parts of the said base are stirred into 90 parts of sulfuric acid monohydrate and 5 parts of fuming sulfuric acid of 28% strength, the mixture being heated to and maintained at 50° until a test specimen, after having been neutralized with sodium hydroxide, is completely soluble in water. The mixture is then poured into 1000 parts of aqueous sodium chloride solution of 15% strength and the resultant precipitate suction-filtered off. The precipitate is washed with aqueous sodium chloride solution of 15% strength, the moist precipitate converted into paste form with a sufficient quantity of sodium carbonate to convert the free dyestuff into the form of its sodium salt, after which the paste is dried. The thus-obtained dyestuff dyes wool yellow-orange.

Similar dyestuffs are obtained when, in the present example and while otherwise proceeding as therein described, the 1-amino-2-methyl-4-(3'-chloro)-phenylamino-anthraquinone is replaced by an equivalent amount of 1-amino-2-methyl-4-(4'-chloro)-phenylamino-anthraquinone.

Example 16

18 parts of 1-amino-2-methyl-4-(2'-methoxy)-phenylamino-anthraquinone, 100 parts of acetoacetic acid ethyl ester and 4 parts of 1-methylbenzene-4-sulfonic acid are heated to 140° while stirring. Easily-volatile reaction products are removed from the reaction vessel by means of a gentle stream of air, the temperature of 140° being maintained until a test specimen turns red in benzene and there is no further change in this color. Then, after cooling the reaction mixture to 75°, 100 parts of ethyl alcohol are added and the precipitate, which crystallizes out in the form of fine needles, is suction-filtered off at 25°. The precipitate is washed with ethyl alcohol until the wash-liquid runs only slightly colored, after which the precipitate is washed with water and then dried. The thus-obtained base dissolves with orange-red coloration in benzene.

10 parts of the said base are stirred into 70 parts of sulfuric acid monohydrate, and the mixture heated to and maintained at 35° until a test specimen, after neutralization thereof with sodium hydroxide, is completely water-soluble. The mixture is then poured, with stirring, into 1000 parts of water, 60 parts of sodium hydroxide solution of 30% strength are added, the precipitate is suction-filtered off and then washed with aqueous sodium chloride solution of 2% strength until the wash-liquid has only a weak acid reaction, after which the still moist precipitate is made up into a paste with 5 parts of sodium carbonate. The thus-obtained dyestuff dyes wool red.

Similar dyestuffs are obtained when, while otherwise proceeding as above described in this example, the 1-amino-2-methyl-4-(2'-methoxy)-phenylamino-anthraquinone is replaced by an equivalent amount of 1-amino-2-methyl-4-(4'-methoxy)-phenylamino-anthraquinone or of 1-amino-2-methyl-4-(2'-methoxy-5'-methyl)-phenylamino-anthraquinone.

Example 17

19 parts of 1-amino-2-methyl-4-(1')-naphthylamino-anthraquinone, 100 parts of acetoacetic acid ethyl ester and 4 parts of 1-methylbenzene-4-sulfonic acid are heated to 140° while stirring. Readily volatile reaction products are removed from the reaction vessel with the aid of a gentle stream of air, the temperature of 140° being maintained until a test specimen turns red-orange in benzene and there is no further change in this color. Thereupon, after cooling to 75°, 100 parts of ethyl alcohol are added and the mixture allowed to cool further. The precipitate, which separates in the form of crystalline needles, is washed with ethyl alcohol until the wash-liquid runs only slightly colored, after which the precipitate is washed with water and dried. The thus-obtained base dissolves in red-orange coloration in chlorobenzene.

10 parts of the said base are stirred into 70 parts of sulfuric acid monohydrate and the mixture heated to and maintained at 40° until a test specimen, neutralized with sodium hydroxide, is completely water-soluble. Thereupon the mixture is poured into 1000 parts of water and the resultant precipitate filtered off with suction. The precipitate is then washed with aqueous sodium chloride solution of 2% strength until the filtrate has only a weak acid reaction, after which the still moist precipitate is converted into a paste with 4 parts of sodium carbonate. The thus-obtained dyestuff dyes wool orange.

If, while otherwise proceeding as described in the preceding two paragraphs, the 1-amino-2-methyl-4-(1')-naphthylamino-anthraquinone is replaced by an equivalent amount of 1-amino-2-methyl-4-(2')-naphthylamino-anthraquinone, a similar dyestuff is obtained.

Example 18

19 parts of 1-amino-2-methyl-4-(1')-ar.-tetrahydronaphthylamino-anthraquinone, 100 parts of acetoacetic acid ethyl ester and 4 parts of 1-methylbenzene-4-sulfonic acid are heated to 140° while stirring. Easily-volatile reaction products are removed from the reaction vessel by means of a gentle current of air, and the temperature of 140° is maintained until a test specimen withdrawn from the reaction mixture turns orange in benzene and there is no further change in this color. Then, after cooling to 75°, 100 parts of ethyl alcohol are added, whereupon the reaction mixture is allowed to cool further. The thus-separated precipitate is suction-filtered off, and washed with ethyl alcohol until the wash-liquid runs only slightly colored, after which the washing is continued with water, and the precipitate finally dried. The thus-obtained base dissolves with orange coloration in benzene.

10 parts of this base are stirred into 70 parts of sulfuric acid monohydrate, the temperature of the mixture being maintained at 40° until a test speciment thereof, neutralized with sodium hydroxide, is completely water-soluble. The mixture is thereupon stirred into 1000 parts of water, and the resultant precipitate separated with suction filtration. The precipitate is then washed with aqueous sodium chloride solution of 2% strength until the wash-liquid has only a slightly acid reaction, after which the still moist precipitate is converted into paste form with 4 parts of sodium carbonate, and then dried. The thus-obtained dyestuff which corresponds to the formula

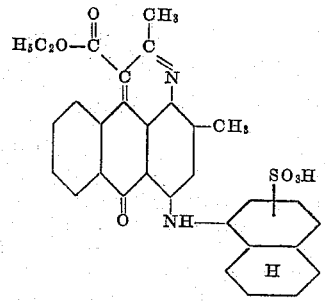

dyes wool orange.

A similar dyestuff is obtained when, while otherwise proceeding as described in the foregoing two paragraphs, the 1-amino-2-methyl-4-(1')-ar.-tetrahydronaphthylaminoanthraquinone is replaced by an equivalent amount of 1 - amino - 2 - methyl - 4 - (2') - ar. - tetrahydronaphthylamino-anthraquinone.

*Example 19*

20 parts of 1-amino-2-methyl-4-(4'-phenyl)-phenylamino-anthraquinone, 40 parts of acetoacetic acid ethyl ester, 80 parts of chlorobenzene and 4 parts of 1-methylbenzene-4-sulfonic acid are heated to 125° while stirring. The readily-volatile reaction products are displaced from the reaction zone by means of a gentle stream of air. The temperature of 125° is maintained until a test specimen withdrawn from the reaction mixture turns orange-yellow in pyridine and there is no further change in this color. The reaction mixture is then allowed to cool down to 70°, after which 150 parts of ethyl alcohol are added and then the formed crystalline precipitate is suction-filtered off at 20°. The precipitate is washed with ethyl alcohol until the wash-liquid runs only slightly colored, after which it is washed with water and then dried. The base dissolves with orange coloration in benzene.

10 parts of this base are stirred into 100 parts of sulfuric acid monohydrate and 10 parts of fuming sulfuric acid of 28% strength, a temperature of 40° being maintained until a test specimen of the reaction mixture has, following neutralization of the specimen with sodium hydroxide, become completely water-soluble. The mixture is then poured, while stirring, into 500 parts of water, and the precipitate filtered off with suction and washed with water until the wash-water runs only slightly acid. The still moist precipitate is then pasted with 4 parts of sodium carbonate, after which it is dried. The thus-obtained dyestuff dyes wool orange.

The dyestuff base can also be sulfonated in the presence of boric acid. For this purpose, 10 parts of the base are stirred into 70 parts of sulfuric acid monohydrate to which 2.5 parts of boric acid have been added, and the mixture maintained at 35° until a test specimen thereof—boiled and adjusted to alkalinity with sodium hydroxide solution—is completely soluble in water. The mixture is then stirred into 1000 parts of water at 80°, and the precipitate suction-filtered off and washed with water until the wash-water runs only slightly acid. The still moist precipitate is then made up into a paste with 3 parts of sodium carbonate, and then dried. The thus-obtained dyestuff dyes wool orange.

*Example 20*

23 parts of 1-amino-2-methyl-4-(4'-[4''-chloro]-phenoxy)-phenylamino-anthraquinone, 100 parts of acetoacetic acid ethyl ester and 4 parts of 1-methylbenzene-4-sulfonic acid are heated to 135° while stirring. A stream of air is passed over the reaction vessel in order to entrain and remove easily-volatile reaction products. The temperature of 135° is maintained until a test specimen of the reaction mixture turns orange in benzene and there is no further change in this color. The mixture is then allowed to cool to 75°, 200 parts of ethyl alcohol are added, and the resultant precipitate suction-filtered off at 25°. The precipitate is washed with ethyl alcohol until the wash-liquid runs only slightly colored, and then with water, and then dried. The thus-obtained base dissolves with red-orange coloration in benzene.

10 parts of the said base are stirred into 70 parts of sulfuric acid monohydrate, the mixture being maintained at 35° until a test specimen, after neutralization with sodium hydroxide, is completely soluble in water. The mixture is then stirred into 1000 parts of water, and the resultant precipitate suction-filtered off. The precipitate is washed with water until the wash-water runs only slightly acid, after which the still moist precipitate is made up into a paste with 5 parts of sodium carbonate, and is then dried. The thus-obtained dyestuff dyes wool orange.

Similar dyestuffs are obtained when, while otherwise proceeding as described in the present example, the 1-amino-2-methyl-4-(4'-[4''-chloro]-phenoxy)-phenylamino-anthraquinone is replaced by an equivalent amount of 1-amino-2- methyl-4- (4'- phenoxy)- phenylamino- anthraquinone or of 1-amino-2-methyl-4-(4'-benzyl-2'-methyl)-phenylamino-anthraquinone.

*Example 21*

21 parts of 1-amino-2-phenoxy-4-(4'-methyl)-phenylamino-anthraquinone, 40 parts of acetoacetic acid ethyl ester, 40 parts of chlorobenzene and 3 parts of 1-methylbenzene-4-sulfonic acid are heated to 115° while stirring. Readily-volatile reaction products are removed from the reaction zone by entrainment in a gentle stream of air passed over the reaction vessel. The temperature is gradually raised to 125°. As soon as a test specimen of the reaction mixture turns yellow in benzene and there is no further change in this color, the mixture is allowed to cool to 80°, 150 parts of ethyl alcohol are added in the course of 20 minutes, and the mixture allowed to cool further to 20°. The resultant base which crystallizes out is separated by suction filtration, and then washed with ethyl alcohol until the wash-liquid runs weakly yellow in color, after which it is washed with water and then dried. The base is an orange powder which dissolves with yellow-orange coloration in benzene.

10 parts of the base are introduced at 0° into a mixture of 75 parts of sulfuric acid monohydrate and 25 parts of fuming sulfuric acid of 28% strength. As soon as a test specimen of the reaction mixture, after neutralization of the specimen with sodium hydroxide, has become completely water-soluble, the reaction mass is introduced into 500 parts of an aqueous sodium chloride solution of 25% strength, the temperature rising to 50°. After cooling back to 20°, the precipitate is suction-filtered off and washed neutral with aqueous sodium chloride solution of 25% strength. The moist filter cake is pasted up with sodium carbonate and is then dried. There is thus obtained a dyestuff in the form of a brown powder which dissolves with orange coloration in water and dyes wool orange from an acid bath.

*Example 22*

25 parts of 1-amino-2-(4'-tert.-amyl)-phenoxy-4-phenylamino-anthraquinone, 40 parts of acetoacetic acid ethyl ester, 40 parts of chlorobenzene and 3 parts of 1-methylbenzene-4-sulfonic acid are heated to 130° while stirring, a gentle stream of air being passed over the reaction mixture to remove easily-volatile reaction products. The temperature of 130° is maintained until a test specimen of the reaction mixture turns orange-yellow in benzene and there is no further change in this color. After cooling the reaction mixture to 80°, 150 parts of ethyl alcohol are then added in the course of 30 minutes, after which the mixture is allowed to cool down to 20°. The formed precipitate is filtered off with suction and washed with ethyl alcohol until the wash-liquid runs only weakly yellow in color, after which the washing is completed with water. The resultant base is, in dry form, an orange powder which dissolves with orange-yellow coloration in benzene.

10 parts of the said base are introduced at 0° into a mixture of 75 parts of sulfuric acid monohydrate and 25 parts of fuming sulfuric acid of 28% strength, the mixture being stirred at 0–3° until a test specimen thereof, after neutralization with sodium hydroxide, is completely soluble in water. The reaction solution is then introduced into 500 parts of aqueous sodium chloride solution of 10% strength and then filtered off with suction. The precipitate is washed with 10% aqueous sodium chloride solution and then taken up in 500 parts of water, warmed to 90°. 3 parts of sodium carbonate are added and the dyestuff is precipitated at 95° by the gradual addition of 100 parts of sodium chloride. The crystalline precipitate is filtered off with suction while hot and is washed with hot 20% aqueous sodium chloride solution until the wash-liquid runs off colorless. The thus-obtained dyestuff is, in the dry state, an orange crystalline powder and dissolves with orange-yellow coloration in water. It dyes wool orange-yellow from an acid bath.

Example 23

19 parts of 1-amino-4-bromo-anthraquinone-2-sulfonic acid (free acid) and 100 parts of acetoacetic acid ethyl ester are heated to 125° while stirring, readily-volatile reaction products being removed from the reaction zone by passing a gentle stream of air thereover. The temperature of 125° is maintained until a test specimen of the reaction mixture turns yellow in pure sulfuric acid (96%) and there is no more than a very slight tendency to turn toward the greenish yellow upon the addition of paraformaldehyde. 150 parts of benzene are then added to the reaction mixture after it has been allowed to cool to 75° and then, after further cooling, the resultant precipitate is filtered off with suction. The precipitate is washed with benzene until the wash-liquid runs colorless, after which it is dried. The dried precipitate is stirred into 500 parts of water, 3 parts of sodium carbonate and 10 parts of activated charcoal are added, and the mixture heated to 98°. The solution is then filtered and 120 parts of sodium chloride are added to the filtrate at 95°. The crystalline precipitate which separates out is suction-filtered off while hot, and washed with 500 parts of 15% aqueous sodium chloride solution and then dried. There is obtained a reddish crystalline powder which corresponds to the formula

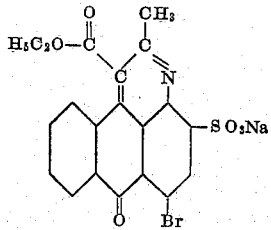

and which dissolves with pale orange coloration in water. The solution in sulfuric acid is citron yellow.

Example 24

40 parts of 1-amino-4-phenylamino-anthraquinone-2-sulfonic acid (free acid), 60 parts of acetoacetic acid propyl ester, 30 parts of nitrobenzene and 10 parts of phenol are heated to 140° while stirring, readily-volatile reaction products being removed from the reaction zone by means of a gentle stream of air. The temperature of 140° is maintained until a test specimen of the reaction mixture turns orange in a 1% aqueous sodium carbonate solution. 200 parts of chlorobenzene are added and 14 parts of sodium carbonate are poured in at 140°. The mixture is allowed to cool to 20°, and the precipitate is filtered off with suction, washed with benzene until the wash-liquid runs colorless, and dried. There is obtained an orange dyestuff which dyes wool orange.

Example 25

40 parts of 1-amino-4-(4'-methyl)-phenylamino-anthraquinone-2-sulfonic acid (free acid) are added in the course of 2 hours, with stirring, to 100 parts of acetoacetic acid ethyl ester at 160°, readily-volatile products of the reaction which takes place being removed by the passage over the reaction mass of a gentle stream of air. After another half hour, there are added, at 125°, 200 parts of chlorobenzene and, portionwise, 8 parts of sodium carbonate, after which the mixture is allowed to cool to 20°. The resultant precipitate is filtered off with suction and washed with benzene until the wash-liquid runs only weakly colored, after which the precipitate is dried. The thus-obtained dyestuff is an orange powder which dyes wool orange-red.

Similar dyestuffs are obtained when, while otherwise proceeding as set forth in the preceding paragraph, the 1-amino-4-(4'-methyl)-phenylamino-anthraquinone-2-sulfonic acid is replaced by an equivalent amount of 1-amino-4-(2'-methyl)-phenylamino-anthraquinone-2-sulfonic acid or of 1-amino-4-(3'-methyl)-phenylamino-anthraquinone-2-sulfonic acid.

Example 26

20 parts of 1-amino-4-(2',3'-dimethyl)-phenylamino-anthraquinone-2-sulfonic acid (free acid), 50 parts of acetoacetic acid ethyl ester and 50 parts of nitro-benzene are heated to 145°, while stirring, until a test specimen of the reaction mixture turns orange-red in a 1% aqueous sodium carbonate solution and there is no further change in this color. During the reaction readily-volatile reaction products are removed from the reaction vessel with the aid of a gentle stream of air. Thereupon 100 parts of chlorobenzene are added to the reaction mixture, which is then allowed to cool down to 20°. The resultant precipitate is filtered off with suction, and washed with benzene until the wash-liquid is only weakly colored, and then dried. The thus-obtained free dyestuff-acid is taken up in 1000 parts of water at 95°, and then 4.5 parts of sodium chloride and 5 parts of sodium carbonate are added, with stirring. The crystalline precipitate is filtered off hot with suction, and washed with hot 1% aqueous sodium chloride solution until the wash-liquid is light orange colored. The dyestuff product, after being dried, is a red-orange crystalline powder and dyes wool orange-red.

A similar dyestuff is obtained when, while otherwise proceeding as described in the preceding paragraph, the 1-amino-4-(2',3'-dimethyl)-phenylamino-anthraquinone-2-sulfonic acid is replaced by an equivalent quantity of 1-amino-4-(3',4',dimethyl)-phenylamino-anthraquinone-2-sulfonic acid.

Example 27

20 parts of 1-amino-4-(2',6'-dimethyl)-phenyl-amino-anthraquinone-2-sulfonic acid (free acid), 30 parts of acetoacetic acid ethyl ester, 15 parts of nitrobenzene and 5 parts of phenol are heated to 150° while stirring. Easily-volatile reaction products are removed from the reaction vessel with the aid of a gentle stream of air. Test specimens are introduced into aqueous sodium carbonate solution of 1% strength. When the color of these test specimens becomes yellow and undergoes no further change, 100 parts of chlorobenzene are added to the reaction mixture and then, at 120°, 7 parts of sodium carbonate. The whole is allowed to cool to 20° whereupon the dyestuff which crystallizes out is filtered off with suction, washed with benzene until the wash-liquid is colorless, and dried. The dyestuff dyes wool orange-yellow.

A similar dyestuff is obtained when, while otherwise proceeding as described in the preceding paragraph, the 1-amino-4-(2',6'-dimethyl)-phenylamino-anthraquinone-2-sulfonic acid is replaced by an equivalent amount of 1-amino-4-(2',4',6'-trimethyl)-phenylamino-anthraquinone-2-sulfonic acid.

Dyestuffs which dye wool in orange-red shades are obtained when, while otherwise proceeding as described in the first paragraph of the present example, the 1-amino-4-(2',6'-dimethyl)-phenylamino-anthraquinone-2-sulfonic acid is replaced by an equivalent quality of 1-amino-4-(2',4'-dimethyl)-phenylamino-anthraquinone-2-sulfonic acid or of 1-amino-4-(2',5'-dimethyl)-phenylamino-anthraquinone-2-sulfonic acid.

Example 28

40 parts of 1-amino-4-(2'-chloro)-phenylamino-anthraquinone-2-sulfonic acid (free acid), 60 parts of acetoacetic acid ethyl ester, 30 parts of nitrobenzene and 10 parts of phenol are heated to 145° while stirring, readily volatile reaction products being removed from the reaction vessel with the aid of a gentle stream of air. When test specimens in aqueous 1% sodium carbonate solution turn orange and there is no further change in this color, the reaction mixture is cooled to 120° and 200 parts of chlorobenzene and 7 parts of sodium carbonate are added, whereupon the whole is cooled to 20°. The resultant precipitate is then filtered off with suction, washed with benzene until the wash-liquid is colorless, and dried. The dried precipitate is taken up in 300 parts of water at 95°, and 3 parts of sodium carbonate are added. Suction filtration is then carried out hot, followed by washing with hot aqueous 1% sodium chloride solution, and drying. The thus-obtained dyestuff dyes wool a bright yellow-orange.

Similar dyestuffs are obtained when while otherwise proceeding as described in the foregoing paragraph the 1-amino-4-(2'-chloro)-phenylamino-anthraquinone-2-sulfonic acid is replaced by an equivalent quantity of 1-amino-4-(3'-chloro)-phenylamino-anthraquinone-2-sulfonic acid or of 1-amino-4(4'-chloro)-phenylamino-anthraquinone-2-sulfonic acid.

*Example 29*

40 parts of 1-amino-4-(4'-methoxy)-phenylamino-anthraquinone-2-sulfonic acid (free acid) and 1 part of amino-benzene are added at 160°, in the course of 2 hours and while stirring, into a mixture of 60 parts of acetoacetic acid ethyl ester and 40 parts of nitrobenzene. Easily volatile reaction products are eliminated from the reaction chamber with the aid of a gentle stream of air. The temperature is maintained at 155° until test specimens in aqueous 1% sodium carbonate solution turn red and there is no further change in this color. The reaction mixture is then diluted with 200 parts of chlorobenzene, and 7 parts of calcined soda added at 120°. The temperature of the mixture is reduced to 20°, after which the precipitate is suction-filtered off, washed with benzene until the wash-liquid is colorless, and dried. The thus-obtained dyestuff dyes wool red. A similar dyestuff is obtained when, while otherwise proceeding as described in the present example, the 1-amino-4-(4'-methoxy)-phenylamino-anthraquinone-2-sulfonic acid is replaced by an equivalent quantity of 1-amino-4-(2'-methoxy)-phenylamino-anthraquinone-2-sulfonic acid.

*Example 30*

40 parts of 1-amino-4-(2'-methoxy-5'-methyl)-phenylamino-anthroquinone-2-sulfonic acid (free acid), 60 parts of acetoacetic acid ethyl ester, 30 parts of nitrobenzene and 10 parts of phenol are heated to 160° while stirring. Readily-volatile reaction products are removed from the reaction vessel with the aid of a gentle stream of air. The temperature of 160° is maintained until a test specimen of the reaction mixture turns red in a 1% aqueous sodium carbonate solution and there is no further change in color. The reaction mixture is then diluted with 200 parts of chlorobenzene. The whole is allowed to cool and then 12 parts of aqueous sodium hydroxide solution of 30% strength are added. The resultant precipitate is filtered off with suction, washed with benzene, dried, and dissolved in 2000 parts of water at 95°. The hot solution is filtered, 50 parts of sodium chloride added to the filtrate at 95°, and the resultant precipitate suction-filtered off while hot. It is then washed neutral with aqueous 1% sodium chloride solution, and dried. The thus-obtained dyestuff dyes wool red.

*Example 31*

40 parts of 1-amino-4-(2')-naphthylamino-anthraquinone-2-sulfonic acid (free acid) and 100 parts of nitrobenzene are heated to 155° while stirring. At this same temperature, 60 parts of acetoacetic acid ethyl ester are run in in the course of 4 hours, and evolved easily-volatile reaction products removed from the reaction zone by the passage of a gentle stream of air. The temperature is thereupon raised to and maintained at 160° until a test specimen withdrawn from the reaction mixture turns red in aqueous 1% sodium carbonate solution and there is no further change in this color. Then, at 125°, 150 parts of chlorobenzene are added and the whole allowed to cool. The formed crystalline precipitate is filtered off with suction, washed with benzene until the wash-liquid runs colorless, dried, and taken up in 2000 parts of water. The reaction mass is then heated to 95° while stirring, and 13 parts of sodium carbonate are added. The brown crystalline precipitate which is thrown down is suction-filtered off hot, and washed with hot aqueous 1% sodium chloride solution until the wash-liquid runs colorless, and then washed with cold water and dried. The resultant dyestuff dyes wool orange-red.

A similar dyestuff is obtained when, while otherwise proceeding as described in the foregoing paragraph, the 1-amino-4-(2')-naphthylamino-anthraquinone-2-sulfonic acid is replaced by an equivalent amount of 1-amino-4-(1')-naphthylamino-anthraquinone-2-sulfonic acid.

*Example 32*

40 parts of 1-amino-4-(1')-ar.-tetrahydronaphthylamino-anthraquinone-2-sulfonic acid (free acid), 60 parts of acetoacetic acid ethyl ester, 30 parts of nitrobenzene and 10 parts of phenol are heated to 130° while stirring. Easily-volatile reaction products are displaced from the reaction vessel with the aid of a gentle stream of air, and the temperature kept at 130° until a test specimen withdrawn from the reaction mixture turns orange in aqueous 1% sodium carbonate solution and there is no further change in this color. The reaction mixture is then diluted with 200 parts of chlorobenzene and 14 parts of sodium carbonate added at 120°. The whole is then allowed to cool, after which the resultant precipitate is filtered off with suction, washed with benzene until the wash-liquid runs only slightly colored, and dried. The thus-obtained dyestuff dyes wool orange-red.

A similar dyestuff is obtained when, while otherwise proceeding as in the preceding paragraph, the 1-amino-4-(1')-ar.-tetrahydronaphthylamino-anthraquinone-2-sulfonic acid is replaced by an equivalent amount of 1-amino-4-(2')-ar.-tetrahydronaphthylamino-anthraquinone-2-sulfonic acid.

*Example 33*

40 parts of 1-amino-4-(4'-phenyl)-phenylamino-anthraquinone-2-sulfonic acid (free acid) are stirred in the course of 3 hours into a mixture, heated to 160°, of 60 parts of acetoacetic acid ethyl ester and 40 parts of nitrobenzene, and the resultant readily-volatile reaction products which are evolved are removed from the reaction zone with the aid of a gentle stream of air. The temperature is continued to be maintained at 160° until test specimens in aqueous sodium carbonate solution turn orange-red and there is no further change in this color. Then 200 parts of chlorobenzene are added at 120°, after which 7 parts of sodium carbonate are poured in slowly. After cooling the reaction mass to 20°, the precipitate is suction-filtered off therefrom, washed with benzene until the wash-liquid runs colorless, and dried.

10 parts of the thus-obtained product are added at 20° and while stirring, to 90 parts of sulfuric acid monohydrate, stirring being continued until a test specimen, neutralized with aqueous sodium hydroxide solution, is soluble in aqueous sodium chloride solution of 5% strength. The reaction mass is then poured into 1000 parts of aqueous sodium chloride solution of 25% strength, and the resultant precipitate filtered off with suction, washed with aqueous sodium chloride solution of 10% strength, and dried. The thus-obtained dyestuff dyes wool red.

*Example 34*

20 parts of 1-amino-4-(4'-phenoxy)-phenylamino-anthraquinone-2-sulfonic acid (free acid) are gradually stirred, in the course of 17 hours, into a boiling mixture of 60 parts of acetoacetic acid ethyl ester and 250 parts of chlorobenzene. Then, at 125°, 14 parts of sodium carbonate are added and the reaction mass allowed to cool. The resultant precipitate is filtered off with the aid of suction, washed with benzene until the filtrate runs colorless, and dried. The thus-obtained dyestuff dyes wool yellowish red.

*Example 35*

40 parts of 1-amino-4-(2'-carboxy)-phenylamino-anthraquinone-2-sulfonic acid (free acid), 60 parts of acetoacetic acid ethyl ester, 60 parts of nitrobenzene and 10 parts of phenol are heated to 160° while stirring. Evolved readily-volatile reaction products are removed from the reaction vessel by means of a gentle stream of air. The temperature of 160° is maintained until test specimens in aqueous 1% sodium carbonate solution turn orange and there is no further change in this color. 100 parts of chlorobenzene are then added to the reaction mixture, and the crystalline precipitate is separated by suction-filtration. The precipitate is washed with chlorobenzene until the wash-liquid runs colorless, and then with benzene. After drying, the precipitate is dissolved in 1000 parts of water and 20 parts of sodium carbonate, with stirring. The solution is heated to 75°, 100 parts of sodium chloride added, and the whole allowed to cool. The thus-produced precipitate is filtered off with suction, washed with aqueous sodium chloride solution of 10% strength, and dried. The obtained dyestuff dyes wool red-orange.

A similar dyestuff is obtained when, while otherwise proceeding as set forth in the foregoing paragraph, the 1 - amino - 4 - (2' - carboxy) - phenylamino - anthraquinone-2-sulfonic acid is replaced by a corresponding quantity of 1-amino-4-(3'-carboxy)-phenylamino-anthraquinone-2-sulfonic acid.

*Example 36*

20 parts of 1-amino-4-(4'-carboxy)-phenylamino-anthraquinone-2-sulfonic acid (free acid), 50 parts of acetoacetic acid ethyl ester and 100 parts of malonic acid diethyl ester are heated to 160° while stirring. Evolved easily-volatile reaction products are removed from the reaction chamber by means of a gentle stream of air. The temperature is maintained at 160° until a test specimen withdrawn from the reaction mixture turns orange in aqueous sodium carbonate solution (1%) and there is no further change in this color. The reaction mixture is then allowed to cool, 200 parts of benzene added at 30°, and the formed precipitate separated by suction filtration and washed with benzene until the wash liquid runs colorless. The precipitate is then dried and taken up in 1000 parts of water at 90°, 10 parts of sodium carbonate and 200 parts of sodium chloride stirred in, and the precipitate which crystallizes out separated, while hot, by means of suction filtration. The thus-separated precipitate is washed with hot aqueous sodium chloride solution of 17% strength until the washliquid is substantially colorless and no longer alkaline, after which the precipitate is dried. The thus-prepared dyestuff dyes wool orange.

*Example 37*

40 parts of 1-amino-4-(4'-methyl)-phenylamino-anthraquinone-2-sulfonic acid (free acid), 400 parts of acetoacetic acid methyl ester and 1 part of pyridine are heated to 135° while stirring. The evolved readily-volatile reaction products are removed from the reaction chamber with the aid of a gentle stream of air, and the temperature maintained at 135° until a test specimen in aqueous sodium carbonate solution (1%) turns orange-red and there is no further change in this color. Thereupon, at 130°, 4 parts of sodium carbonate are added to the reaction mixture, the latter cooled to 70°, 100 parts of benzene added, and the whole allowed to cool further.

The obtained crystalline precipitate is filtered off with suction, washed with benzene until the wash-liquid is only slightly colored, and dried. The thus-obtained dyestuff dyes wool orange-red.

*Example 38*

20 parts of 1-amino-4-(1')-ar.-tetrahydronaphthyl-amino-anthraquinone-2-sulfonic acid (free acid) are stirred, in the course of 2 hours, into a mixture of 30 parts of acetoacetic acid methyl ester and 20 parts of nitrobenzene heated to 160°, evolved easily-volatile reaction products being removed with the aid of a gentle stream of air. This is followed by rinsing with 15 parts of chlorobenzene and 0.2 part of aminobenzene. The temperature is maintained at 155° for another half hour, after which 100 parts of chlorobenzene and 7 parts of sodium carbonate are added at 120° and the reaction mixture allowed to cool. A crystalline precipitate separates out and this is filtered off with suction, washed with benzene until the wash-liquid is only slightly colored, and dried. The thus-obtained dyestuff dyes wool orange-red.

*Example 39*

23 parts of the sodium salt of the sulfonic acid of 1-amino-2-methyl-4-(4'-methyl) - phenylamino - anthraquinone, 150 parts of acetoacetic acid butyl ester and 1.8 parts of sulfuric acid monohydrate are heated to 130° while stirring. Evolved easily-volatile reaction products are displaced from the reaction vessel and the temperature kept at 130° until a test specimen withdrawn from the reaction mixture turns orange in ethyl alcohol and no further change in this color takes place. The reaction mixture is then cooled down to 70°, 100 parts of benzene are added, and the resultant precipitate filtered off with suction at 20°. The precipitate is washed with benzene until the wash-liquid is only slightly colored, and is then dried. The free dyestuff-acid is stirred into 300 parts of water, 3 parts of sodium carbonate added, and precipitation effected at 95° with 3 parts of sodium chloride. The precipitate is suction-filtered off while hot, washed with aqueous sodium chloride solution (1%) until the washliquid runs only slightly colored, and dried. The thus-obtained dyestuff dyes wool orange.

*Example 40*

56 parts of 1-amino-2-methyl-4-nitro-anthraquinone are stirred in the course of a half hour into a mixture, heated to 150°, of 200 parts of acetoacetic acid methyl ester and 1 part of technical alkane sulfonic acid mixture (1–3 C), evolved easily-volatile reaction products being removed with the aid of a gentle current of air. The reaction mixture is then cooled to 20° and the precipitate which is thrown down is suction-filtered off. The precipitate is washed first with methyl alcohol and then with water, after which it is dried. It corresponds to the formula

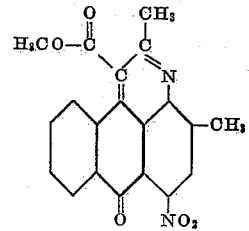

By filtration from acetone over aluminum oxide, brick-red prisms are obtained, which melt at 214° with decomposition. They dissolve in pure sulfuric acid with pale yellow coloration, and with yellow coloration in benzene and acetone. An alcoholic-aqueous suspension of the substance assumes an intense green coloration upon the addition of aqueous sodium sulfhydrate solution.

*Example 41*

54 parts of 1-amino-2-methyl-4-methoxy-anthraquinone are stirred, in the course of 1 hour, into a mixture, heated to 155°, or 200 parts of acetoacetic acid methyl ester and 1 part of technical alkane sulfonic acid, evolved easily-volatile reaction products being eliminated by means of a gentle stream of air. The reaction mixture is then allowed to cool to 20°, the crystalline precipitate is filtered off with suction and washed, first with methyl alcohol, and then with water. After drying, the product is in the form of brownish-colored prisms which melt at 175–176° and dissolve with citron yellow coloration in pure sulfuric acid and with pale yellow coloration in benzene.

The 200 parts of acetoacetic acid methyl ester can be replaced, in this example, by 200 parts of acetoacetic acid ethyl ester or 200 parts of acetoacetic acid propyl ester or 200 parts of acetoacetic acid butyl ester.

*Example 42*

If, instead of 21 parts of 1-amino-2-phenoxy-4-(4'-methyl)-phenylamino-anthraquinone, there are used in the Example 21 18 parts of 1-amino-2-methoxy-4-(4'-methyl)-phenylamino-anthraquinone or 19 parts of 1-amino-2-propoxy-4-(4'-methyl)-phenylamino - anthraquinone, similar dyestuffs are obtained, dissolving with orange coloration in water and dyeing wool orange from acid baths.

*Example 43*

24 parts of 4-bromo-1,9-carbethoxyanthrapyridine-2-sulfonic acid (a synonymous term is 1-carbethoxy-2-methyl - 6 - bromo-aza-(3)-benzanthrone-4-sulfonic acid), obtained according to Example 23, 100 parts of water and 150 parts of aqueous ammonium hydroxide solution (30%) are stirred and heated in the course of 6 hours to 75°. This temperature is maintained during 2 hours. Then 10 parts of sodium chloride are added; the mass is allowed to cool to 50°, the precipitate is suction-filtered off, washed with aqueous sodium chloride solution (5%) until the wash-liquid runs only slightly colored, and dried. An orange-yellow product is obtained which dissolves with yellow coloration in water and dyes wool yellow from an acid bath. The new dyestuff corresponds to the formula

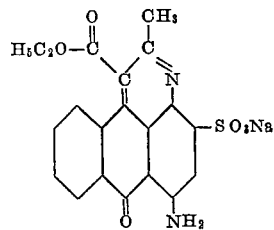

*Example 44*

10 parts of wool skein are introduced, at 50–60°, into a dyebath containing in solution, per 500 parts of water, 0.1 part of the dyestuff according to Example 17, 1.5 parts of Glauber's salt and 0.2 part of formic acid. The bath is slowly heated to boiling, and the dyeing is carried out at the boil for ½ to 1 hour. The wool, after being thoroughly rinsed with water and dried, is dyed in orange shades.

Equally as good dyeings are obtained if, in the preceding, the formic acid is omitted or is replaced by 0.2 part of ammonium acetate.

*Example 45*

10 parts of nylon fibers are introduced, at 50–60°, into a dyebath containing in solution, per 300 parts of water, 0.5 part of the dyestuff according to Example 11, and 0.5 part of acetic acid of 30% strength by weight. Dyeing is carried out for 30 minutes at 95–100°, then 1 part of the 30% acetic acid is added, and dyeing continued for 30 more minutes at the same temperature, whereupon the nylon fibers, dyed in orange shades, are rinsed and dried.

Having thus disclosed the invention, what is claimed is:

1. A process for the manufacture of compounds of the anthrapyridine series comprising the steps of condensing a primary amine of the anthraquinone series selected from the group consisting of compounds corresponding to the formulae (a) 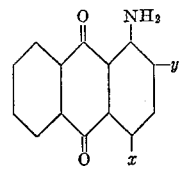

(b) 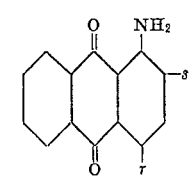

wherein $x$ stands for a member selected from the group consisting of Cl, Br, $NO_2$ and $OCH_3$, $y$ stands for a member selected from the group consisting of H, Cl, Br, lower alkyl and $SO_3H$, $r$ stands for a member selected from the group consisting of arylamino radicals of the benzene and naphthalene series, and $s$ stands for a member selected from the group consisting of H, Cl, Br, lower alkyl, $SO_3H$, lower alkoxy and mononuclear aryloxy, with a lower alkyl ester of acetoacetic acid under acid conditions and in the presence of added acid selected from the group consisting of sulfuric acid, phosphoric acid, hydrochloric acid, hydrobromic acid, alkane sulfonic acids with 1 to 3 carbon atoms, benzene sulfonic acid and 1-methylbenzene-4-sulfonic acid in an organic solvent at temperatures between 100 and 180° C. and while distilling off the by-products formed during the reaction.

2. A process according to claim 1, wherein said primary amine corresponds to Formula $b$ and the obtained condensation product is treated with a sulfonating agent.

3. The process for the manufacture of a compound of the anthrapyridine series comprising the step of condensing 1 - amino - 2,4 - dibromoanthraquinone with the ethyl ester of acetoacetic acid under acid conditions in chlorobenzene as a solvent in the presence of added 1-methylbenzene-4-sulfonic acid at a temperature of 100–130° C. and while distilling off the by-products formed during the reaction.

4. The process for the manufacture of a compound of the anthrapyridine series comprising the step of condensing 1-amino-2-methyl-4-bromoanthraquinone with the ethyl ester of acetoacetic acid in an excess of the said ester under acid conditions in the presence of added alkane sulfonic acid with 1 to 3 carbon atoms at a temperature of 130–135° C. and while distilling off the by-products formed during the reaction.

5. The process for the manufacture of a compound of the anthrapyridine series comprising the step of condensing 1-amino-4-bromoanthraquinone with the ethyl ester of aceto-acetic acid in an excess of the said ester under acid conditions in the presence of added alkane sulfonic acid with 1 to 3 carbon atoms at a temperature of 135° C. and while distilling off the by-products formed during the reaction.

6. The process for the manufacture of a compound of the anthrapyridine series comprising the step of condensing 1-amino-2-methyl-4-nitroanthraquinone with the methyl ester of aceto-acetic acid in an excess of the said ester under acid conditions in the presence of added alkane sulfonic acid with 1 to 3 carbon atoms at a temperature of 150° C. and while distilling off the by-products formed during the reaction.

7. A compound of the anthrapyridine series which corresponds to the formula

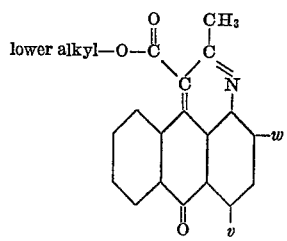

8. The compound of the anthrapyridine series which corresponds to the formula

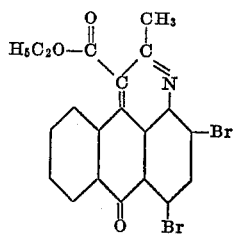

9. The compound of the anthrapyridine series which corresponds to the formula

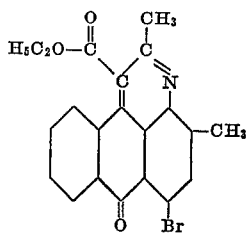

wherein $v$ stands for a member selected from the group consisting of chlorine, bromine, nitro and methoxy, and $w$ stands for a member selected from the group consisting of hydrogen, chlorine, bromine, lower alkyl and the sulfonic acid group.

10. The compound of the anthrapyridine series which corresponds to the formula

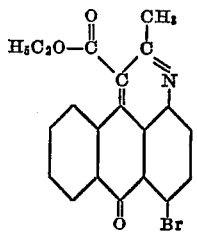

11. The compound of the anthrapyridine series which corresponds to the formula

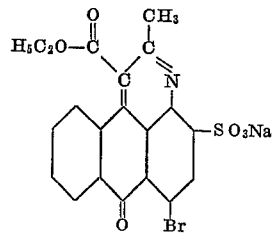

12. The compound of the anthrapyridine series which corresponds to the formula

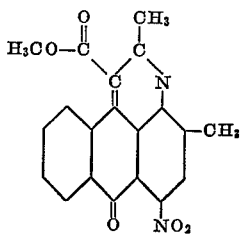

References Cited in the file of this patent

UNITED STATES PATENTS

| | | |
|---|---|---|
| 1,891,317 | Peter | Dec. 20, 1932 |
| 2,029,007 | Weinand | Jan. 28, 1936 |

FOREIGN PATENTS

| | | |
|---|---|---|
| 185,548 | Germany | June 26, 1906 |
| 659,651 | Germany | May 7, 1938 |